Figure 28:
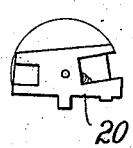

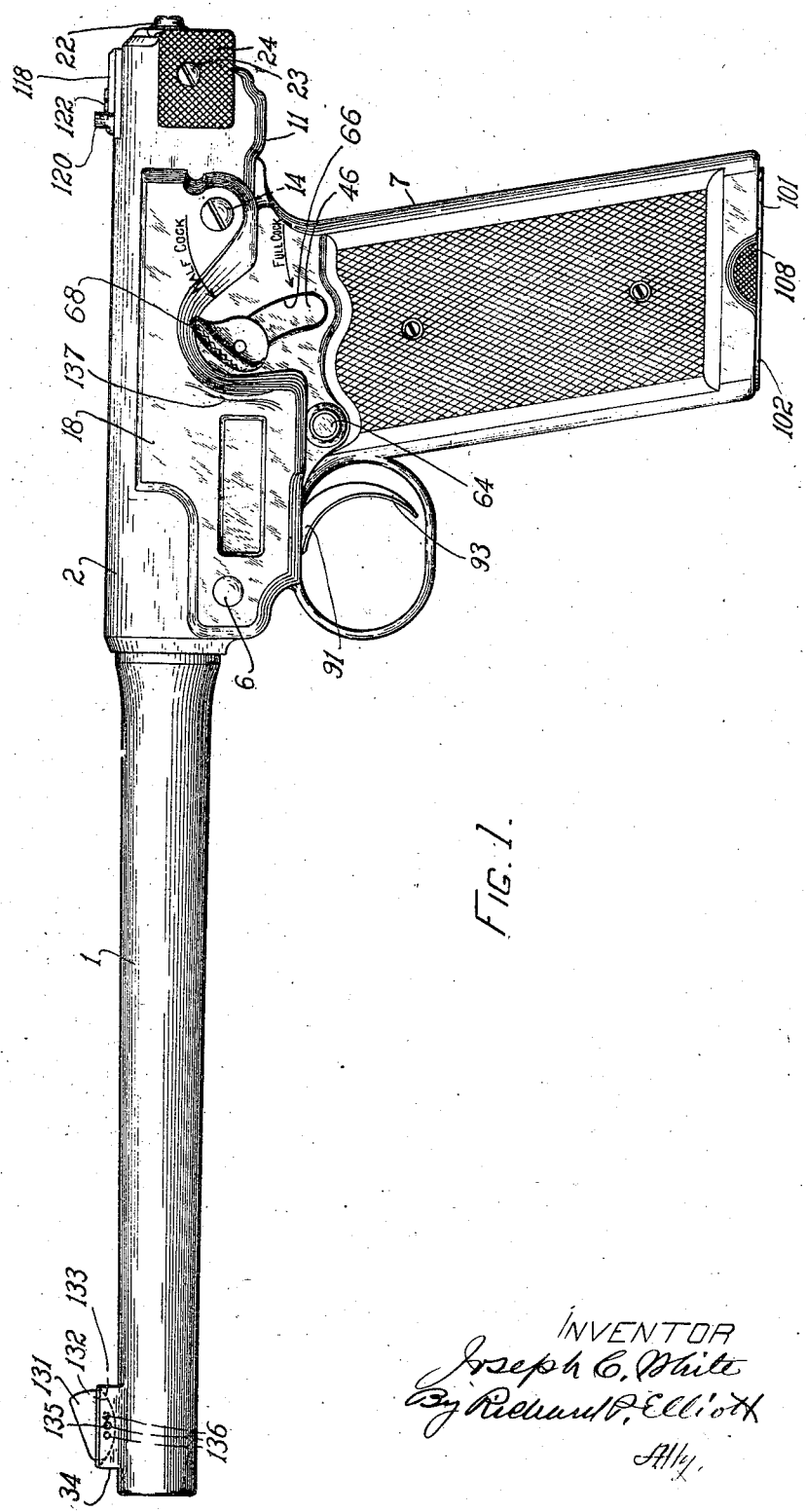

No. 888,560. PATENTED MAY 26, 1908.
J. C. WHITE.
FIREARM.
APPLICATION FILED NOV. 9, 1905.
6 SHEETS—SHEET 2.
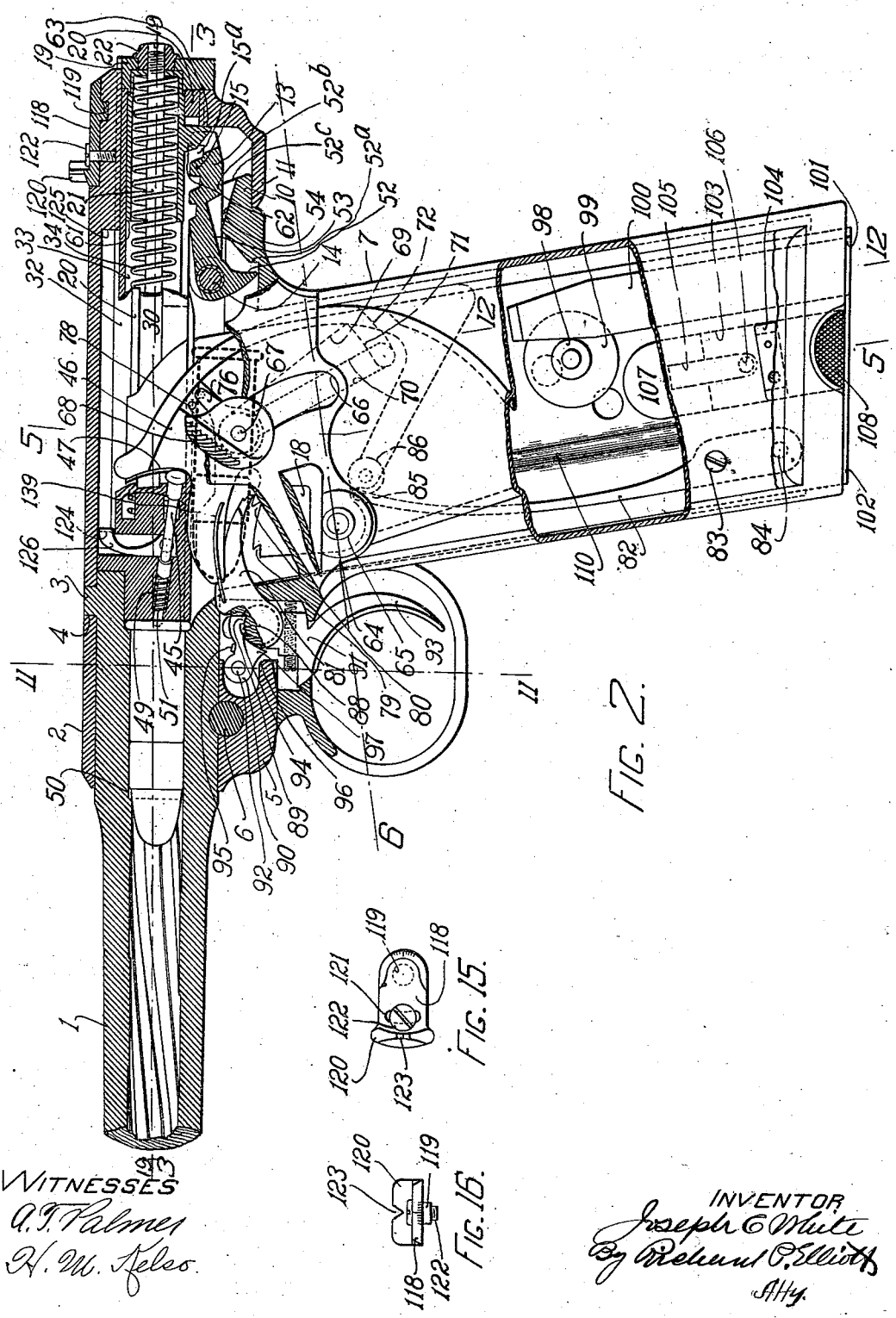
WITNESSES
A. T. Palmer
H. M. Kelso.
INVENTOR
Joseph C. White
By Richard O. Elliott
Atty.

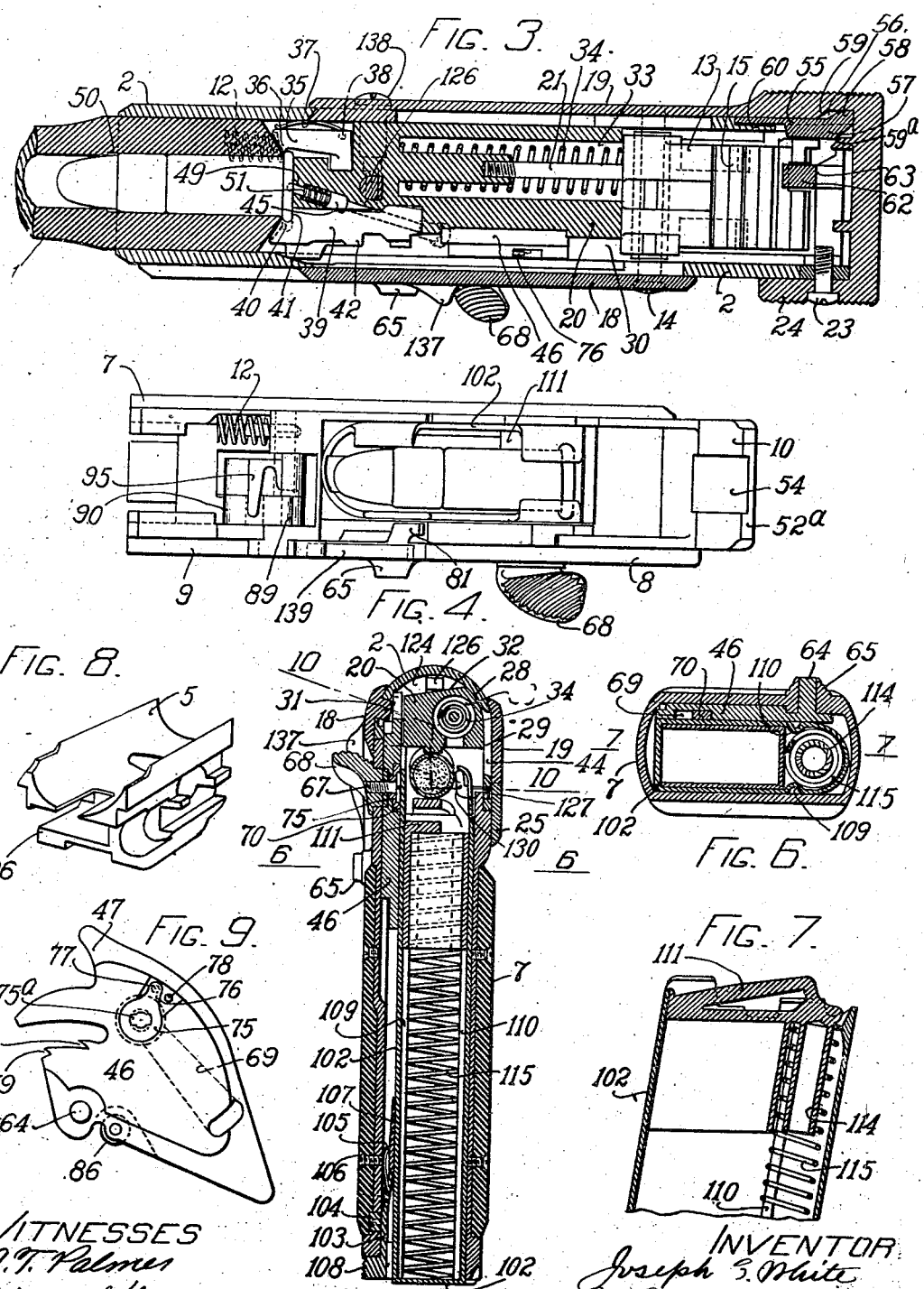

No. 888,560.
J. C. WHITE.
FIREARM.
APPLICATION FILED NOV. 9, 1905.
PATENTED MAY 26, 1908.
6 SHEETS—SHEET 4.
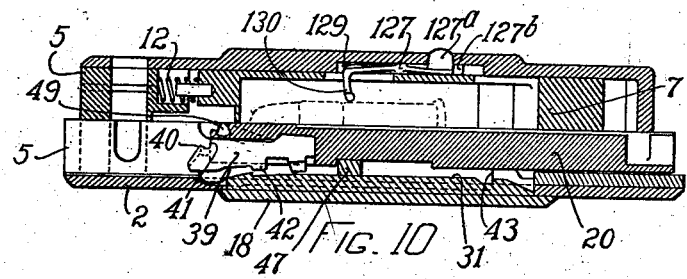
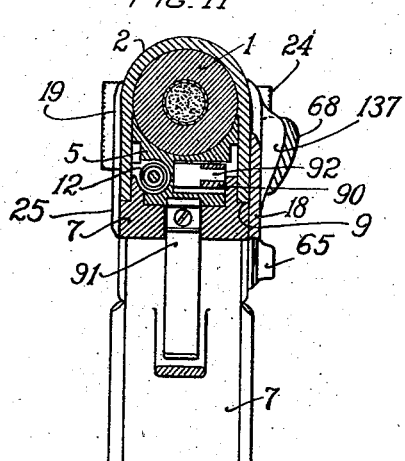
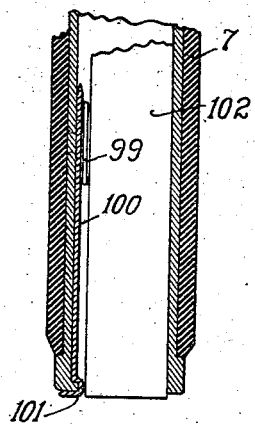
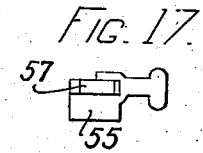
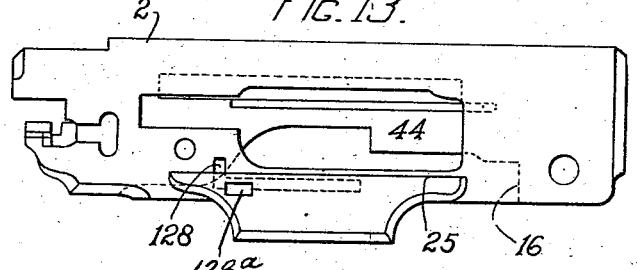
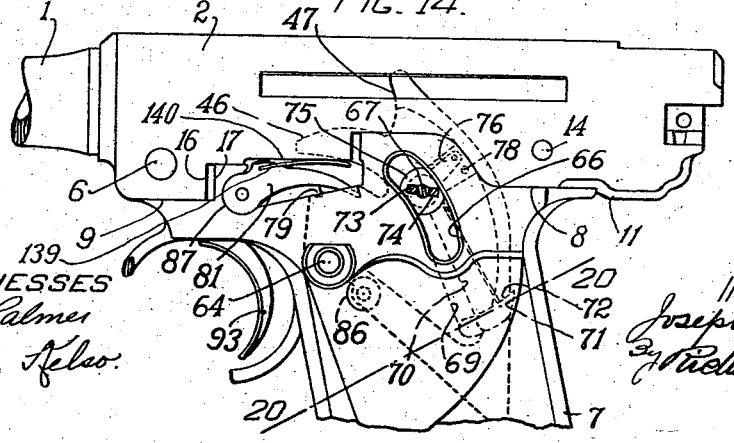
WITNESSES
A. T. Palmer
H. M. Kelso
INVENTOR
Joseph C. White
By Richard P. Elliott
Atty No. 888,560.
J. C. WHITE.
FIREARM.
APPLICATION FILED NOV. 9, 1905.
PATENTED MAY 26, 1908.
6 SHEETS—SHEET 5.
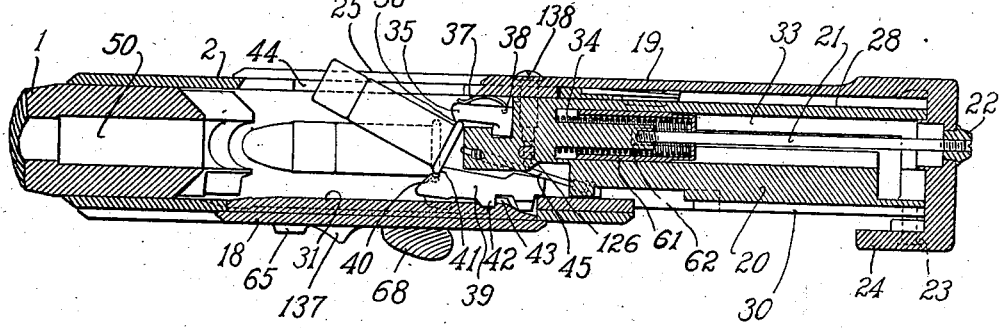
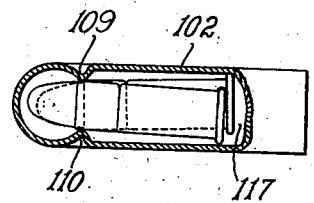
FIG. 21.
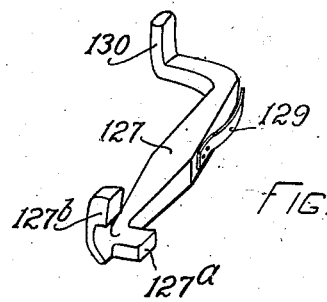
FIG. 25.
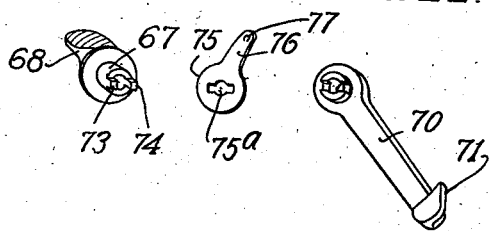
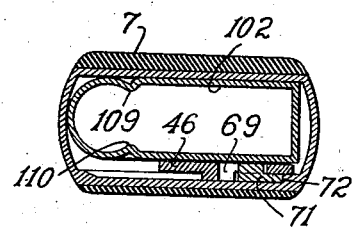
FIG. 20.
WITNESSES
A. F. Palmer
H. M. Kelso
INVENTOR
Joseph C. White
By Richard P. Elliott
Atty.

No. 888,560. PATENTED MAY 26, 1908.
J. C. WHITE.
FIREARM.
APPLICATION FILED NOV. 9, 1905.

6 SHEETS—SHEET 6.

WITNESSES
A. T. Palmer
J. M. Kelso

INVENTOR
Joseph C. White
By Richard P. Elliott
Atty.

UNITED STATES PATENT OFFICE.

JOSEPH C. WHITE, OF CHELSEA, MASSACHUSETTS, ASSIGNOR, BY DIRECT AND MESNE ASSIGN-
MENTS, TO WHITE-MERRILL COMPANY, OF BOSTON, MASSACHUSETTS, A CORPORATION
OF MASSACHUSETTS.

FIREARM.

No. 888,560.        Specification of Letters Patent.      Patented May 26, 1908.

Application filed November 9, 1905. Serial No. 286,554.

*To all whom it may concern:*

Be it known that I, JOSEPH C. WHITE, a citizen of the United States, and a resident of Chelsea, county of Suffolk, Commonwealth of Massachusetts, have invented certain new and useful Improvements in Firearms, of which the following is a specification, reference being had to the drawings accompanying the same.

My invention relates to that class of firearms in which the unlocking and opening of the breech, the ejection of the empty cartridge shell, the cocking of the hammer, the introduction of a loaded cartridge from a magazine into the chamber of the barrel, and the closing and the locking of the breech, are automatically accomplished by means of the recoil of the moving parts which takes place at the time of firing.

The objects of my invention are as follows:—To produce a firearm that is accurate, simple in its operation, inexpensive to manufacture, and that will not easily get out of order.

Another object of my invention is to produce an automatic firearm wherein barrels of different caliber may be used without changing the breech locking mechanism, and a magazine holder that can be made to accommodate magazines filled with cartridges of different calibers.

A further object of my invention is to so construct the automatic loading and unloading mechanism and the breech mechanism that a side hammer may be used that can be cocked and fired with one hand while held in an aimed position.

A further object of my invention is to provide a cartridge ejector that will act as an extractor at the first part of its movement, and thereafter act as an ejector to throw the cartridge outward, downward and forward of the firing line.

A further object of my invention is to so construct the firearm that it may be used for single fire and automatically open the breech-block, extract and eject the cartridge, and automatically lock the breech-block in its open position so that a loaded cartridge may be inserted in the receiving chamber, the breech-block being then unlocked by hand, or it may be automatically unlocked and closed by the top cartridge in the magazine when it is inserted in the magazine holder.

A further object of my invention is to produce a firearm in which the longitudinally moving parts to eject the empty shell and reload the firearm are very light in weight, and therefore less calculated to affect the aim by their movement; also permit of the use of a very small charge of powder without affecting the automatic ejection of an empty shell, the reloading with a loaded shell, the cocking of the hammer, and the relocking of the breech-block and the barrel.

A still further object of my invention is to produce a locking mechanism in which the locking parts of the mechanism are in full engagement until the recoil movement of the barrel and the receiver secured to it have reached their rearmost position.

Various other features of my improvement will be more particularly referred to and described hereafter.

Figure 26:
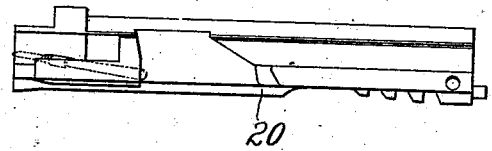
Figure 27:
Figure 29:
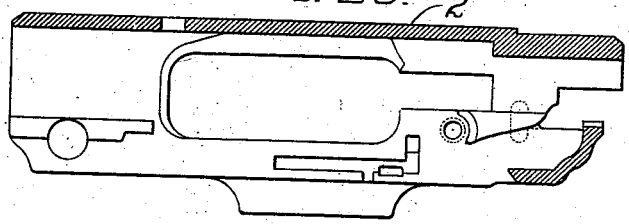
Figure 30:
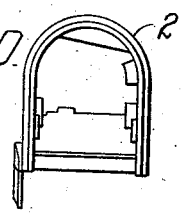
Figure 31:
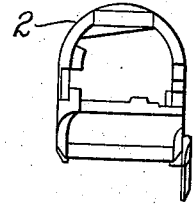
Figure 32:
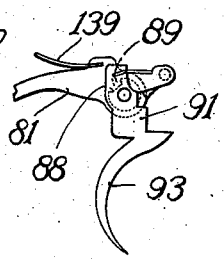
Figure 34:
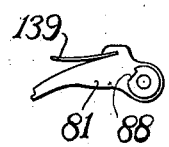
Figure 33:
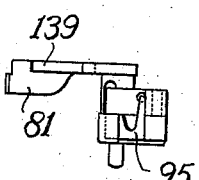
Figure 35:

In the drawings accompanying this specification, in which I have represented the embodiment of my invention, already referred to; Figure 1 is a left hand side elevation of a pistol embodying my invention, with the breech closed and the hammer uncocked, and showing the thumb-piece of the hammer. Fig. 2 is a left hand sectional elevation of a pistol taken longitudinally through the barrel, receiver and breech closing mechanism, showing a sectional view of the various operating parts in detail. Fig. 3 is a sectional plan view through line 3—3, Fig. 2. Fig. 4 is a plan view of the magazine holder or grip and the parts attached thereto. Fig. 5 is a sectional elevation through line 5—5, Fig. 2. Fig. 6 is a sectional plan view through the magazine on line 6—6, Fig. 2. Fig. 7 is a sectional elevation through the magazine taken on line 7—7, Fig. 6. Fig. 8 is the locking block which serves to secure the barrel to the receiver. Fig. 9 is a detailed view of the hammer showing the safety catch for holding the same at half cock against accidental displacement, or against being released by a pull on the trigger. Fig. 10 is a longitudinal sectional elevation of a portion of the automatic mechanism, taken through line 10—10, Fig. 5. Fig. 11 is a vertical front sectional elevation of the pistol looking from the front through line 11—11 Fig. 2, showing the parts of the automatic mechanism in section. Fig. 12 is a sectional end elevation of a portion of the grip or magazine holder through line 12—12, Fig. 2. Fig. 13 is a side elevation of the receiver removed from the barrel and grip. Fig. 14 is a left hand side elevation of the pistol showing the portions of the mechanism cut away and the hammer and safety-catch in dotted lines. Fig. 15 is a plan view of the adjustable rear sight. Fig. 16 is an end elevation of same. Fig. 17 is a plan of locking bolt catch. Fig. 18 is a side elevation of same. Fig. 19 is a longitudinal sectional plan view of my device through line 19—19 Fig. 2 showing the breech-block moved rearwardly in the position the various parts occupy when an empty shell is being ejected. Fig. 20 is a sectional plan view through line 20—20 Fig. 14 of the grip with the magazine for holding the cartridges inserted. Fig. 21 is a sectional plan view of the magazine showing the position of the cartridge. Fig. 22 is an isometric view of the safety-catch for locking the hammer. Fig. 23 is an isometric view of the spring for frictionally holding the safety-catch in its adjusted position. Fig. 24 is an isometric view of the thumb-piece for cocking the hammer by hand. Fig. 25 is an isometric view of the latch for holding the breech-block and cover-plate in their open positions. Fig. 26 is a side elevation of the breech-block; Fig. 27 is an end elevation of the breech-block from the rear; Fig. 28 is a front elevation of the breech-block; Fig. 29 is a sectional side elevation of the receiver with the operating mechanism removed; Fig. 30 is a front end elevation of the receiver; Fig. 31 is a rear end elevation of the receiver; Fig. 32 is a side elevation of the sear, trigger and locking catch; Fig. 33 is a plan of same; Fig. 34 is a side elevation of the sear; and Fig. 35 is a side elevation of the sear pull.

In the drawings, 1 represents the barrel of my improved firearm; and 2 the receiver which partially surrounds the rear end of the barrel, and is secured thereto by a pin 3 which projects through the opening 4 in the top of the receiver. The barrel is held upwardly in its secured position as shown in Fig. 2 by means of the block 5 which is shaped to fit the bottom of the barrel and the opening in the forward end of the receiver. The block 5 is held in its proper position by means of the screw 6.

7 is the grip and magazine holder, which has on its upper surface the ledges 8 and 9, upon which the receiver 2 is adapted to rest in such manner as to slide longitudinally thereon. The magazine holder is held in engagement with said receiver by means of the overhanging portion 10 on the rear of the grip passing in and over the portion 11 of the receiver 2, and at the front end by means of the block 5 and the screw 6, in such manner that the receiver and block are free to slide longitudinally upon the ledges 8 and 9, a distance equal to the recoil or unlocking movement of the barrel and receiver.

The barrel 1 and the receiver 2 are held forward in the position shown in Fig. 2 by means of the recoil spring 12, which is shown in full lines in Figs. 10 and 11. The barrel is prevented from moving rearwardly more than a predetermined distance by means of the shoulder 16 coming in contact with the shoulder 17.

13 is a locking-plate for locking the breech-block which locking plate is pivoted to the receiver by the pivot screw 14 upon which it is free to oscillate at certain portions of the movement of the barrel and receiver; 15$^a$ and 15 are interlocking teeth formed on the plate 13 and the breech-block 20. The function of the plate 13 will be more fully explained hereinafter.

The cover-plate 18 is designed to cover the opening in the left hand side of the receiver 2, and the cover-plate 19 to cover the opening in the receiver 2 through which the empty shells are ejected. The cover-plate 19 is attached to the breech-block 20 by means of the screw threaded rod 21, the nut 22 and the screw 23 which passes through the portion 24 and the breech-block 20. Said cover-plate 19 is guided in its longitudinal movement by the edge of the plate 25 and the breech-block.

The breech-block 20 is formed with a curved edge 28 on one side and the corner 29 which serves to guide it on the right hand side. It is provided on the left hand side with a groove 30 which slides upon a guide 31 formed in the cover-plate 18. It also has a flat surface 32 at its top which serves to further guide it by contact with a corresponding flat surface in the top of the receiver. The breech-block is provided with the pin 21 attached to its front end and extending through a round hole 33 formed throughout its length, which round hole is adapted to receive a spiral recoil spring 34 which serves to return the breech-block and cover-plate to their normal positions after a loaded cartridge has been inserted in the chamber in the barrel. The breech-block 20 is also provided with the shell extractor 35 which is pivoted in an orifice in the forward end of the breech-block, and has a forwardly disposed hook portion 36 formed to engage the rim of the cartridge for extracting it.

37 is a flat spring mounted at one end in an orifice 38 in the extractor 35, and extends forward in a curved line to press upon its front end and upon the inner wall of the cover-plate in such manner as to press the extractor 35 firmly against the rim of the cartridge.

39 is what I term the extractor ejector, as it is provided with the hook portion 40 at its front end shaped to engage the rim of the cartridge, and the transverse portion 41 formed to press against the head of the cartridge in such manner that when the breech-block 20 recoils upon firing, the hook portion 40 will serve to assist the extractor 35 in extracting the shell from the chamber of the barrel; but in moving backward from engagement with the breech of the barrel, the point 42 will engage the shoulder 43, thereby stopping the further backward movement of the extractor ejector 39, causing the shoulder 41 and the portion 40 to move forward in the breech-block 20 to release the hook from the rim of the cartridge, and cause the shoulder to cock the cartridge shell forward and outward to eject it outwardly through the opening 44 in the side of the receiver. The breech-block 20 as it moves rearwardly serves to cock the hammer 46 by contact of its striking portion 47 with the head of the firing pin 45, and also by its contact with the lowermost face of the breech-block.

The hammer 46 is held at full cock and prevented from falling when the face of the breech-block passes backward from over the portion 47 by contact of said portion 47 with the under-side of the forward end of the extractor ejector 39, and is held in such position until a loaded cartridge has been moved upwardly in the path of the returning breech-block to be inserted in the chamber 50 of the barrel. Then as the breech-block 20 moves forward, the hammer is released by the extractor ejector and held by the sear. This holding of the hammer at full cock during the major portion of the movement of the breech-block gives ample time for the sear to engage the notches in the hammer.

The breech-block has a hole 49 in its forward end adapted to receive the firing pin 45, and so positioned that the forward end of the firing pin will contact with the primer of a cartridge inserted in the chamber 50 of the barrel. The forward end of the firing pin is surrounded by a spiral spring 51 which serves to retract it and withdraw it from the primer of the cartridge when the hammer is cocked.

The locking plate 13 is shown in Fig. 2 in the position it occupies when the teeth 15, 15ᵃ on the bottom of the breech-block and the top of said plate 13 are in interlocking engagement. When the recoil due to firing takes place, the receiver, barrel and breech-block recede backward until the projection 52 contacts with the wall 52ᵃ; thereupon the cam surface 52ᵇ slides downwardly upon the inclined wall 52ᶜ of the magazine holder, allowing the locking plate 13 to drop downwardly until the face 53 of said locking-plate contacts with the face 54 of the grip or magazine holder, thus disengaging said teeth 15, 15ᵃ. The locking-plate is held downwardly in its unlocked position by a latch 55. Figs. 17 and 18 show two views of said locking-latch. Said locking-latch 55 is held in position in a recess 56 formed in the rear end of the receiver 2, and has an inwardly projecting ledge 57 which is adapted to pass over the edge of the locking-plate when said latch 55 is pressed inwardly by contact of the projection 58 with the cam portion 59 of the cover-plate 19 and the inner wall of said cover-plate, thus firmly holding the locking-plate downwardly and out of engagement with the breech-block during its rearward travel when extracting and ejecting a cartridge and loading a fresh one from the magazine. The cam shaped projection 59ᵃ serves to disengage the latch 55 from the locking-plate 13 when the teeth 15 and 15ᵃ are in locking position. The breech-block 20 is provided at its rear end with a shell 61 which is inserted through an opening formed to receive it, and is provided with a downwardly projecting lug 62 which upon being inserted is turned around and contacts with a shoulder in the breech-block to prevent its being pushed outwardly by the tension of the recoil spring 34. The shell 61 is a loose fit in the hole 33 in the breech-block, and is free to slide longitudinally therein. It is also provided with a recess longitudinally disposed to receive the outer or rear end of the spring 34. The projecting lug 62 is of sufficient length to drop slidably below the lower surface of the breech-block and be in the path of the ledge 63 formed on the receiver 2, so that when the breech-block is traveling backwardly from the force of the recoil, it will by reason of its contact against the shoulder 63 compress the spring 34 with sufficient tension to return the breech-block and cover-plate to their normal positions.

The hammer 46 is pivoted in the grip upon a pivot point 64 secured therein, which passes through a bearing 65 formed in the side of the magazine holder or grip 7. Said grip 7 has also a curved recess 66 formed in its side, to receive the stud 67 which is a part of the thumb-piece 68 used for cocking the hammer with the thumb. The hammer is provided with what might be termed a safety-catch 70 to prevent the accidental fall of the hammer when cocked. The safety-catch 70 is contained in a recess 69 formed in the side of the hammer. The safety-catch 70 is shown in dotted lines Fig. 14, and consists of a lever pivoted upon the stud 67 at one end so that it may oscillate therewith, its lower end having a pawl or catch portion 71 which is shaped to catch in a recess 72 formed in the shell of the grip 7. The thumb-piece 68 has formed on it bearing lugs 73 and 74 which enter correspondingly shaped recesses in the pivotal portion of the latch lever 70, so that by slightly oscillating the thumb-catch 68, it will swing the latch lever 70 laterally and cause its point 71 to engage and disengage from the recess 72. 75 is a flat spring pivoted upon the pivot 67, and is provided with a hole 75ᵃ shaped to receive the lugs 73 and 74 so that by turning the thumb-piece 68 slightly upon its pivot, the end 76 of the spring 75 will describe an arc about said pivot 67. The spring 75 is also provided with a slight projection 77 on its inner face adapted to engage the detents 78 formed in the side of the hammer. On turning the thumb-piece 68 slightly, the spring portion 76 will yield so that the projection 77 will rise out of the depression 78, slide over and into another one, thus preventing a free lateral movement of the locking latch 70. The hammer 46 is provided with the usual notches 79 and 80 in which the sear 81 will engage when the hammer is half cocked or full cocked. The hammer is also provided with a spring 82 which serves to cause it to rotate on its pivot 64 when the sear is disengaged from the notches 79 and 80 to strike the firing pin. Said spring is attached to the grip 7 by the screws 83 and 84, its upper end being provided with a groove 85 which is adapted to receive the end of a roll 86 pivoted in the lower portion of the hammer.

The sear 81 is pivoted upon a stud formed on its inner face in a hole 87 formed in the side of the grip 7, and is free to oscillate therein. It is provided with a pivot which has a notched portion 88 adapted to receive a downwardly projecting catch portion 89 formed on the sear-pull 90. The sear-pull 90 is pivoted to the trigger 91 by the pivot 92. The trigger 91 is pivoted upon the sear so that it will oscillate upon it. The trigger has a forwardly projecting portion to which the sear pull 90 is attached, said sear-pull being moved bodily in the arc of a circle described from the center of the sear pivot, so that movement of the finger portion 93 of the trigger 91 will cause said sear-pull 90 to revolve the sear through engagement of the projection 89 with a shoulder 94 formed upon the sear pivot. The sear-pull 90 is provided with a flat spring 95 which tends to press its projection 89 into the opening 88.

My firearm is provided with what is termed a safety device to prevent it being automatically fired should the person operating the firearm pull the finger pull of the trigger backwardly to the firing position while the firearm is being automatically loaded.

It is understood that upon firing, the receiver 2 and barrel 1 recede rearwardly slightly during the recoil, to unlock the breech. When the barrel and receiver recede they carry with them the filling block 5. Said filling block 5 is provided with a rearwardly projecting portion 96 which is arranged to contact with a downwardly projecting portion 97 formed on the bottom of the sear-pull 90. This contact of the rearwardly projecting portion 96 with the cam 97 raises the sear-pull upwardly so that the catch 89 will be out of the path of the shoulder 94; hence, if one should hold the trigger back by means of the finger pull, or pull the trigger while the firearm was being automatically loaded, it would not pull the forward end of the sear out of engagement with the notches 79 and 80 designed to retain the hammer in its half cocked or cocked positions, so that it is impossible for the hammer to fall while the breech-block is open in the act of extracting and ejecting a cartridge and reloading the chamber with a loaded cartridge.

The grip 7 is provided with a filling piece or disk 98 on one side, which serves to fill a space in the grip equal to the thickness of the hammer to allow the hammer to play freely. The filling piece 98 has a flange-portion 99 which serves to overlap and hold in place a screw-driver 100. Said screw-driver 100 is more clearly shown in Fig. 12 where it is shown as being thin so that it can spring, and as having a hook portion 101 which is adapted to fit over a projection on the lower end of the grip. The magazine 102 is formed to fill the space between the side wall of the grip and the filling disk 98. It is held in position in the grip 7 by means of the catch 103 which is secured to the side of the grip by the plate 104 and suitable screws.

In Fig. 5 the retaining catch 103 is more clearly shown. 105 is a flat spring so positioned as to contact with the top of the catch 103 and is held in its position by means of a screw 106 which passes through the side wall of the grip 7. Said catch 103 is bent inwardly at its upper end as is shown in Fig. 5, so that when its lowermost portion is sprung outwardly by means of the spring 105, it will contact with the bottom of a ledge 107 secured to the outside of the magazine. To remove a magazine, the milled portion 108 of the catch is pressed inwardly, thereby deflecting the upper end outwardly and from under the ledge 107 to permit the magazine to be withdrawn. The magazine is provided with inwardly projecting ribs 109 and 110 which run from top to bottom thereof and serve as guides for the bullet ends of the cartridge, and serve to keep the bullet ends of the cartridge in line, one above the other. The follower 111 is provided with a round downwardly projecting shell 114 which is adapted to receive the upper end of the spring 115 so that it will act more directly on said follower. The follower is inclined at its top portion to cause the cartridges to be delivered to the breech-block and chamber at the proper angle.

The magazine is designed to take rim cartridges. The projecting portions 109 and 110 on the magazine serve to guide the forward end of the cartridge and are of sufficient distance apart to allow the cartridge shell to move freely upwardly and downwardly between them, while the rear end 117 of the magazine is wide enough so that the rim end of the cartridges are quite loose therein, and the cartridges lie catacorner as illustrated in Fig. 21, allowing the cartridges to lie more nearly at the proper angle for insertion into the chamber than would be possible if they were held rigidly in line one above the other. 118 illustrates the rear sight which is attached to the rear end of the receiver plate upon the pivot point 119 which is pivoted in the upper surface of the receiver 2. The sight portion 120 is formed with a curved slot 121 through which the body of the screw 122 passes, so that the opening 123 of the sight may be varied sidewise by loosening the screw 122 and swinging the sight portion 120 upon the pivot 119 to adjust the pistol to the error in holding or sight of the person using it, as well as to compensate for cross winds.
The recoil movement of the breech-block 20, due to firing, takes place with great rapidity, so that the shoulder 124 on the breech-block 20 would contact with the shoulder 125 in the receiver with considerable force and noise were it not that I provide a spring 126, the upper end of which projects slightly rearward beyond the surface of the shoulder 124 so that it will strike the shoulder 125, and through its flexibility soften the shock of contact of the shoulders 124 and 125.

In case I desire to use my firearm as a single fire pistol, I have provided means whereby the breech-block and receiver will be locked in their open positions after ejecting the empty shell, so that a loaded shell may be inserted in the chamber of the barrel by hand, and thereafter the breech-block and receiver closed. This device consists of the lever 127 which is pivoted in the receiver 2 in such manner that its ends 127ᵃ, 127ᵇ will extend outwardly through openings 128 and 128ᵃ in the side of the receiver to contact the portion 127ᵇ with the end of the cover-plate 19 to lock it in its open position until the end 127ᵃ is pressed inwardly by the hand of the operator to allow the cover-plate and breech-block to close. 129 is a flat spring attached to the locking latch 127 in such manner as to normally press the end 127ᵇ outwardly; 130 is an angular projection on the latch 127 which extends inwardly into the central opening in the receiver in such position as to be in the path of the uppermost cartridge in the magazine, so that when a loaded magazine is inserted in the grip, the topmost cartridge of the magazine will contact with the point 130, deflect the inner end of the latch outwardly and thereby withdraw its end 127ᵇ out of the path of the cover-plate, so that when the firearm is used as an automatic firearm, the breech-block and cover-plate will automatically close without any manipulation of the operator; but when the firearm is used for single fire, the breech- block and cover-plate will be automatically locked in their rearward position.

The sight 131 which is attached to the front end of the barrel is adjustable vertically by means of its circular portion 132 sliding in a circular recess 133 formed in a block 134 attached to the front end of the barrel, and the sight 131 is held in its adjusted position by means of the pin 135 inserted in the holes 136. 137 is a guard formed in the cover-plate 18 and arranged to shield the thumb-piece 68.

The screw 138 is threaded to the breech-block 20 and serves to secure the forward end of the cover-plate 19 to the breech-block, to retain the buffer spring 126 in place, and to hold the firing-pin 45 in position. 139 is a spring attached at one of its ends to the sear 81, its other end bearing against the wall 140 of the receiver 2.

What I claim is—

1. In an automatic firearm, a movable barrel; a receiver detachably secured to said barrel; a breech-block movably secured in the receiver; a recoil spring secured in said breech-block; a sliding sleeve mounted in a recess in the breech-block having a projection extending beyond the surface of the breech-block; and an abutment formed in the receiver against which said projection contacts to compress the spring; and a locking-plate pivoted in the receiver in such manner that it will be in full locking engagement with the breech-block during the greater portion of the recoil movement of the receiver.

2. An automatic firearm having a movable barrel; a movable receiver detachably secured to the barrel; a breech-block slidably mounted in the receiver; a spring mounted in a recess in said breech-block; a sleeve inclosing the rear end of said spring, slidably mounted in the breech-block; a projection on said sleeve extending beyond the walls of the breech-block; an abutment on the receiver against which said projection bears; a locking-plate; locking projections on said locking-plate near one end; a downwardly projecting portion at the other end of said locking-plate, said locking-plate adapted to contact with a shoulder on the grip-frame positively to disengage the locking-plate from the breech-block.

3. In an automatic firearm, a movable barrel; a receiver detachably secured to the barrel and movable therewith; a slidable breech-block mounted in the receiver; a recess in said breech-block; a recoil spring mounted in said recess; a sleeve slidably mounted in said recess adapted to inclose the rear end of the spring; a projection on said sleeve projecting beyond the walls of the breech-block; an abutment in the receiver against which the projection contacts; a locking-plate arranged to lock the breech-block in its closed position; downwardly projecting cam surfaces on the locking-plate for positively locking and unlocking said locking-plate; a surface on the locking-plate which contacts with a surface on the grip for holding the locking-plate in its locked position when the breech-block is closed, said surface being parallel to the movement of the breech-block.

4. In the automatic firearm, a movable barrel; a receiver detachably secured to the barrel and movable therewith; a slidable breech-block mounted in the receiver; a locking-plate mounted in the receiver; means for positively unlocking said locking-plate; and a locking latch mounted in the receiver for positively holding the locking-plate out of engagement with the breech-block during the greater portion of its recoil movement.

5. In an automatic firearm, a movable barrel; a receiver detachably secured to the barrel and movable therewith; a breech-block slidably mounted in the receiver; a locking-plate adapted to lock the breech-block in its closed position; a latch pivoted in said receiver adapted to positively hold the locking-plate in its unlocked position; and means on the cover-plate to cause the latch to engage and be disengaged from the locking-plate.

6. In an automatic firearm, a movable barrel; a receiver detachably secured to the barrel and movable therewith; a breech-block slidably mounted in the receiver; a spring mounted in the breech-block; a sleeve inclosing a portion of said spring having a projection thereon; an abutment formed in the receiver against which said projection is arranged to contact; a locking-plate adapted to lock the breech-block in its closed position; a latch pivoted in said receiver adapted to positively hold the locking-plate in its unlocked position; and means on the cover-plate to cause the latch to engage and be disengaged from the locking-plate.

7. In an automatic firearm, the combination with the grip, of a hammer pivoted within the grip; means for cocking the hammer by the recoil movement of the breech-block; a thumb piece for cocking the hammer by hand; and a safety-catch operated by said thumb-piece.

8. In an automatic firearm, a grip; a hammer pivoted to the inside of the side wall of the grip; a slot in the side wall of the grip; a thumb-piece secured to the hammer and extending through said slot and a safety-catch mounted on the hammer.

9. In a firearm, a barrel; a receiver attached to the barrel and movable therewith; a breech-block slidably mounted in the receiver; a grip upon which the receiver is mounted; a hammer pivoted in one side of said grip; a thumb-piece secured in the hammer and projecting through a slot in the grip; and a safety-catch operated by said thumb-piece.

10. In a firearm, a barrel; a receiver attached to the barrel; a breech-block slidably mounted in the receiver; a projection in the forward end of said breech-block; a spring mounted in a recess in said projection; a projection on the receiver adapted to contact with the spring and projection on the breech-block to cushion the recoil blow of the breech-block.

11. In a firearm, a barrel; a receiver detachably attached to the barrel; both movable; a breech-block slidably mounted in the receiver; a grip upon which the receiver is mounted; a projection on the forward end of the breech-block; an abutment formed in the receiver against which the projection on the breech-block is arranged to contact; a spring in the projection in the breech-block projecting slightly beyond said projection and arranged to contact with the abutment in the receiver before the projection on the breech-block contacts therewith.

12. In a firearm having a movable barrel and a receiver to which the barrel is detachably secured, a breech-block slidably mounted in said receiver; a grip to which the barrel and receiver are secured; a hammer pivoted on the inside of the grip; a spring for operating the hammer; a circular slot in the grip; a thumb-piece secured in the hammer projecting through said slot; a safety catch; and means on the breech-block for cocking the hammer when said breech-block is moved to its open position.

13. In a firearm, the combination of a hammer and a safety catch pivoted in said hammer; a grip in which the hammer is pivoted; and means in the grip to engage the safety-catch.

14. In a firearm, the combination of a hammer pivoted in the grip; a safety-catch pivoted in the hammer; means on the grip adapted to engage the safety-catch; a thumb-piece for cocking the hammer to which the safety-catch is pivoted.

15. In a firearm, the combination of a hammer pivoted in the grip; a safety-catch pivoted on the hammer; a recess in the grip for engaging the safety-catch; a thumb-piece pivoted in the hammer to which the safety-catch is attached; and means whereby the thumb-piece will operate to engage and disengage the catch from the recess when the hammer is partially cocked.

16. In a firearm, the combination of a hammer; a safety-catch mounted in the hammer; a thumb-piece pivoted in the hammer and attached to the safety-catch; and means whereby the act of cocking the hammer will disengage the safety-catch from the grip.

17. In a firearm, a hammer mounted in the grip; a safety-catch pivoted in the hammer; a recess adapted to engage the safety-catch formed in the grip; a thumb-piece pivoted in the hammer to which the safety-catch is attached; a spring pivoted to the thumb-piece having a projection; a detent in the hammer adapted to receive the projection, said spring serving to frictionally hold the safety catch in its adjusted position.

18. In an automatic firearm, a movable barrel; a movable receiver detachably secured to the barrel; a grip on which the barrel and receiver are mounted; a hammer mounted in one side of the grip; a sear pivoted in the grip; a trigger mounted upon the sear pivot; a sear-pull pivoted to the trigger; and means secured to the barrel arranged to disengage the sear-pull from the sear when the barrel is moved rearwardly.

19. In a firearm, the combination with the grip, of a hammer pivoted in the grip; a sear pivoted in the grip; a trigger mounted upon the sear pivot; a sear-pull pivoted to the trigger; and means whereby the recoil of the barrel will disengage the sear-pull from the sear.

20. In a firearm, the combination with the grip, of a hammer pivoted in the grip; a sear pivoted in the grip; a trigger pivoted in the grip; a sear-pull pivoted to the trigger; and means secured to the barrel and receiver, arranged to contact with the sear-pull to disengage it from the sear.

21. In a firearm, a movable barrel and a receiver attached to the barrel; a breech-block slidably mounted in the receiver and moved rearwardly by the recoil due to the firing of the cartridge; a spring to close said breech-block; a hammer mounted in the grip; a sear mounted in the grip adapted to engage the hammer; a trigger mounted upon the sear pivot; and a sear-pull adapted to engage the sear and arranged to be disengaged from the sear while the barrel and breech-block are in their recoil positions.

22. In a firearm, a movable barrel and a receiver attached to the barrel; a breech-block slidably mounted in the barrel and moved rearwardly by the recoil due to the firing of the cartridge; a spring to close said breech-block; a hammer mounted in the grip; a sear mounted in the grip adapted to engage the hammer; a trigger mounted upon the sear pivot; and a sear-pull adapted to engage the sear and arranged to be disengaged from the sear while the barrel and breech-block are in their recoil positions, and to be again engaged with the sear when the barrel, receiver and breech-block are in their normal and closed positions.

23. In a firearm, a movable barrel and receiver attached to the barrel; a breech-block mounted in the receiver in such manner as to slide rearwardly through the recoil due to firing a cartridge; a spring for returning the breech-block to its closed position; a cover-plate to cover the opening through which the empty shells are ejected; said opening; means whereby the breech-block and cover-plate will be automatically locked in their rearmost positions after recoil when the magazine is empty.

24. In a firearm, a movable barrel and a receiver detachably secured to the barrel; a breech-block mounted in the receiver in such manner as to slide rearwardly therein through the recoil due to the firing of a cartridge; a spring for returning the breech-block to its closed position; a cover-plate to cover the opening through which the empty shells are ejected; attached to the breech-block; means whereby the breech-block and cover-plate will be automatically locked in their rearmost position after recoil when the magazine is empty; and means whereby the breech-block and cover-plate may be unlocked to return to their closed positions.

25. In an automatic firearm, the combination in a cartridge-holder of a cartridge-holding recess formed therein, wider at one edge than at the other; guides for guiding the bullet end of the cartridges to keep them in line one above the other and the follower; said follower; a sleeve on the bottom of the follower arranged to inclose the upper end of a spring; and said spring.

In testimony whereof, I have hereunto set my hand, in the presence of two subscribing witnesses, this the fourth day of November, A. D. 1905.

JOSEPH C. WHITE.

Witnesses:
 H. M. KELSO,
 R. P. ELLIOTT.